US008294551B1

(12) United States Patent
Oakes, III

(10) Patent No.: US 8,294,551 B1
(45) Date of Patent: *Oct. 23, 2012

(54) SYSTEMS AND METHODS TO DELIVER INFORMATION TO A MEMBER

(75) Inventor: Charles L. Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,583

(22) Filed: Sep. 26, 2011

Related U.S. Application Data

(63) Continuation of application No. 11/929,228, filed on Oct. 30, 2007, now Pat. No. 8,026,794.

(51) Int. Cl.
*G08B 19/00* (2006.01)
(52) U.S. Cl. .......... 340/5.82; 340/7.52; 340/286.14; 455/414.1; 455/412.2
(58) Field of Classification Search .......... 340/5.82, 340/7.52, 286.14; 455/414.1, 412.2
See application file for complete search history.

(56) References Cited

U.S. PATENT DOCUMENTS

| | | | |
|---|---|---|---|
| 5,442,553 A | 8/1995 | Parrillo | |
| 5,986,690 A | 11/1999 | Hendricks | |
| 6,754,485 B1 | 6/2004 | Obradovich et al. | |
| 7,107,606 B2 | 9/2006 | Lee | |
| 7,133,051 B2 | 11/2006 | Sloo et al. | |
| 7,366,495 B1 | 4/2008 | Magnotta et al. | |
| 7,599,770 B2 | 10/2009 | Hardy | |
| 2001/0022003 A1 | 9/2001 | Narushima | |
| 2003/0014754 A1 | 1/2003 | Chang | |
| 2003/0140346 A1 | 7/2003 | Maa | |
| 2004/0003412 A1 | 1/2004 | Halbert | |
| 2004/0078814 A1 | 4/2004 | Allen | |
| 2004/0203379 A1 | 10/2004 | Witkowski et al. | |
| 2005/0012599 A1* | 1/2005 | DeMatteo | 340/425.5 |
| 2005/0216932 A1 | 9/2005 | Danker | |
| 2005/0246757 A1 | 11/2005 | Relan et al. | |
| 2006/0107283 A1 | 5/2006 | Murphy | |
| 2006/0179466 A1 | 8/2006 | Pearson et al. | |
| 2007/0079335 A1 | 4/2007 | McDonough | |
| 2007/0186252 A1 | 8/2007 | Maggio | |

OTHER PUBLICATIONS

Anderson, J., "Interactive TV Challenges Agencies," [online]. IMedia Communications, Inc., Dec. 6, 2004. [retrieved on Oct. 19, 2007]. Retrieved from the Internet: <URL: http://www.imediaconnection.com/content/4724.asp>, 4 pgs.

Constantakis-Valdez, P., "Interactive Television," [online]. The Museum of Broadcast Communications, 2005 [retrieved on Oct. 18, 2007]. Retrieved from the Internet: <URL: http://www.museum.tv/archives/etv/1/htmll/interactivet/interactivet.htm>, 4 pgs.

(Continued)

*Primary Examiner* — Jennifer Mehmood
*Assistant Examiner* — Mark Rushing
(74) *Attorney, Agent, or Firm* — Brooks, Cameron & Huebsch, PLLC

(57) ABSTRACT

Systems, methods, and computer-readable media deliver a variety of personalized information to a member of an association. In embodiments, information intended for delivery to a member, with or without request by the member, may be delivered via a television transmission, a telematic transmission to a vehicle, or a read-only memory. A password or biometric may be used to authenticate the intended viewer of the delivered information prior to displaying it.

15 Claims, 16 Drawing Sheets

OTHER PUBLICATIONS

Stone, A., et al. "Interactive TV's Really Big Picture," [online]. The McGraw-Hill Companies, Inc., Sep. 7, 2000 [retrieved on Oct. 19, 2007]. Retrieved from the Internet: <URL: http://www.businessweek.com/bwdaily/dnflash/sep2000/nf2000097_655.htm?chan=search>, 4 pgs.

Winslow, G., "Back to the Future," [online]. WSN, Inc., Apr. 2004 [retreived on Oct. 18, 2007]. Retrieved from the Internet: <URL: http://www.worldscreen.com/featuresarchive.php?filename=0404itv>, 8 pgs.

* cited by examiner

SYSTEMS AND METHODS TO DELIVER INFORMATION TO A MEMBER

RELATED APPLICATIONS

The present application is a continuation of U.S. patent application Ser. No. 11/929,228, filed on Oct. 30, 2007, now U.S. Pat. No. 8,026,794, and is also related to the following applications that were assigned to the same assignee as the present application and were filed on even date herewith:

U.S. Ser. No. 11/929,040, filed on Oct. 30, 2007, entitled Systems and Methods To Deliver Information to a Member; and U.S. Ser. No. 11/929,124, filed on Oct. 30, 2007, entitled Systems and Methods To Deliver Information to a Member; and U.S. Ser. No. 11/929,182, filed on Oct. 30, 2007, entitled Systems and Methods To Deliver Information to a Member; and U.S. Ser. No. 11/929,284, filed on Oct. 30, 2007, entitled Systems and Methods To Deliver Information to a Member.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice shall apply to this document: Copyright 2007, USAA.

BACKGROUND

Currently, organizations, associations, and institutions of all types send information to their members in a variety of ways. In general, most such information is sent by U.S. Postal Service mailings. This may be somewhat reliable, but it is relatively slow, requiring several days in transit, and it requires the use of vehicles, thus contributing to fuel consumption, increased traffic, and ultimately, global warming.

In addition, much information sent by organizations is of a very general nature, so it is not tailored to the member and is often discarded by the member before reading it.

Moreover, information requested by an individual from an organization is sometimes confidential, but it is often delivered in a non-confidential way, such as by telephone, email, and regular mail.

Thus, systems and methods are needed that address the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods to deliver information to a member are provided. Various embodiments, including systems, methods, and computer-readable media, to speed the delivery of information to a member in one or more formats that are more convenient to read and more efficient than U.S. mail are described. In some embodiments, the information is customized for the particular member.

Below is a description of other advantages and features of the inventive subject matter.

BRIEF DESCRIPTION OF THE DRAWINGS

Information delivery systems and methods are further described with reference to the accompanying drawings in which.

DETAILED DESCRIPTION

Certain specific details are set forth in the following description and figures to provide a thorough understanding of various embodiments of the inventive subject matter. Certain well-known details often associated with computing and software technology are not set forth in the following disclosure to avoid unnecessarily obscuring the various embodiments of the inventive subject matter. Further, those of ordinary skill in the relevant art will understand that they can practice other embodiments of the inventive subject matter without one or more of the details described below. Finally, while various methods are described with reference to operations and sequences in the following disclosure, the description as such is for providing a clear implementation of embodiments of the inventive subject matter, and the operations and sequences of operations should not be taken as required to practice this inventive subject matter.

Example Computing Devices

Figure 1:
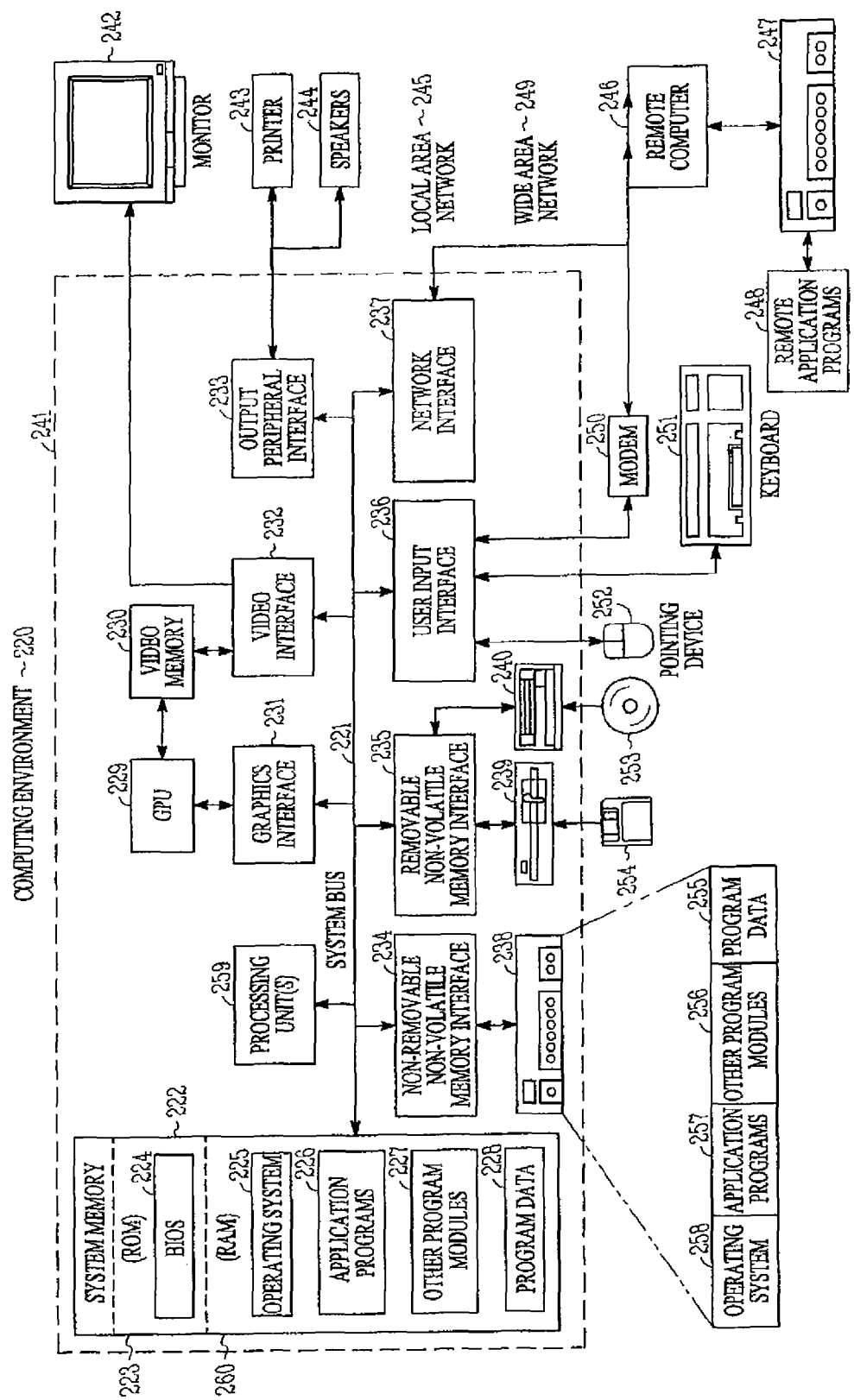
FIG. 1 is a block diagram representing an exemplary computing device suitable for use in conjunction with providing information delivery systems and methods.

Referring to FIG. 1, shown is a block diagram representing an exemplary computing device suitable for use in conjunction with implementing the processes described above. For example, the computer-executable instructions that carry out the processes and methods for a document ordering, retrieving, and delivery system may reside and/or be executed in such a computing environment as shown in FIG. 1. The computing system environment 220 is only one example of a suitable computing environment and is not intended to suggest any limitation as to the scope of use or functionality of the inventive subject matter. Neither should the computing environment 220 be interpreted as having any dependency or requirement relating to any one or combination of components illustrated in the exemplary operating environment 220.

Aspects of the inventive subject matter are operational with numerous other general purpose or special purpose computing system environments or configurations. Examples of well known computing systems, environments, and/or configurations that may be suitable for use with the inventive subject matter include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the inventive subject matter may be implemented in the general context of computer-executable instructions, such as program modules, being executed by a computer. Generally, program modules include routines, programs, objects, components, data structures, etc. that perform particular tasks or implement particular abstract data types. Aspects of the inventive subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the inventive subject matter includes a general purpose computing device in the form of a computer 241. Components and/or subsystems or modules of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 241 typically includes a variety of computer-readable media. Computer- readable media can be any available media that can be accessed by computer 241 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage, or other magnetic storage devices, or any other medium that can be used to store the desired information and that can be accessed by computer 241. Communication media typically embodies computer-readable instructions, data structures, program modules, or other data in a modulated such as a carrier wave or other transport mechanism and includes any information delivery media. The term "modulated data signal" may mean a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

The system memory 222 includes computer storage media in the form of volatile and/or nonvolatile memory such as read-only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer-readable instructions, data structures, program modules, and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Other input devices (not shown) may include a microphone, joystick, game pad, satellite dish, scanner, or the like. These and other input devices are often connected to the processing unit 259 through a user input interface 236 that is coupled to the system bus, but they may be connected by other interface and bus structures, such as a parallel port, game port, or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device, or other common network node, and it typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but they may also include other networks. Such networking environments are commonplace in offices, enterprise-wide computer networks, intranets, and the Internet.

When used in a LAN networking environment, the computer 241 is connected to the LAN 245 through a network interface or adapter 237. When used in a WAN networking environment, the computer 241 typically includes a modem 250 or other element for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other element of establishing a communications link between the computers may be used.

It should be understood that the various techniques described herein may be implemented in connection with hardware or software or, where appropriate, with a combination of both. Thus, the methods and apparatus of the inventive subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the inventive subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the inventive subject matter, e.g., through the use of an API, reusable controls, or the like. Such programs are preferably implemented in a high-level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the inventive subject matter in the context of one or more stand-alone computer systems, the inventive subject matter is not so limited, but rather it may be implemented in connection with any computing environment, such as a network or distributed computing environment. Still further, aspects of the inventive subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the inventive subject matter should not be limited to any single embodiment, but rather it should be construed in breadth and scope in accordance with the appended claims.

Figure 2:
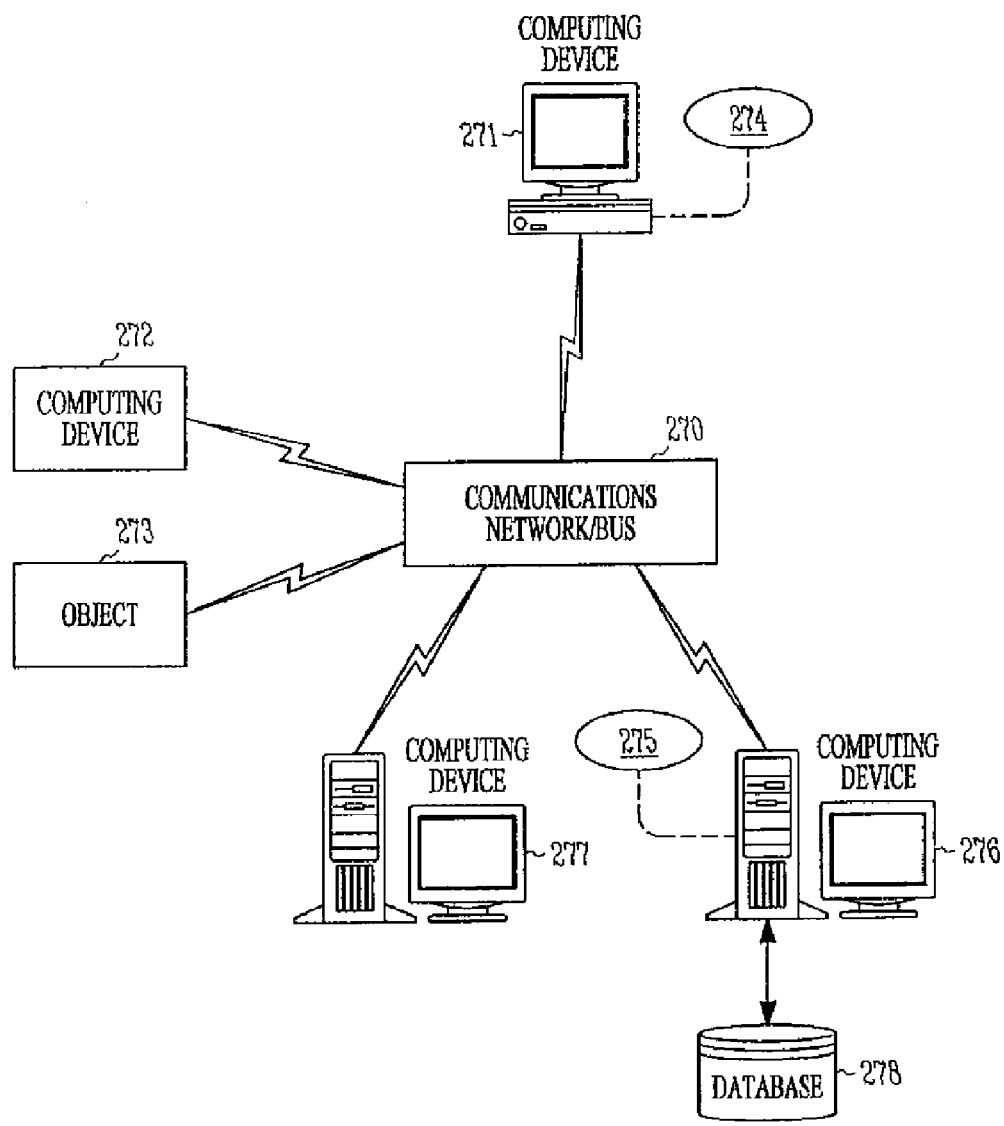
FIG. 2 illustrates an exemplary networked computing environment in which many computerized processes may be implemented to provide information delivery systems and methods.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing a document ordering, retrieving, and delivery system. One of ordinary skill in the art can appreciate that networks can connect any computer or other client or server device, or other devices in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects, or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277, and 278 may comprise or make use of programs, methods, data stores, programmable logic, etc. The entities 271, 272, 273, 274, 275, 276, 277, and 278 may span portions of the same or different devices such as PDAs, audio/video devices, MP3 players, personal computers, etc. Each entity 271, 272, 273, 274, 275, 276, 277, and 278 can communicate with another entity 271, 272, 273, 274, 275, 276, 277, and 278 by way of the communications network 270. In this regard, any entity may be responsible for the maintenance and updating of a database 278 or other storage element.

This network 270 may itself comprise other computing entities that provide services to the system of FIG. 2, and it may itself represent multiple interconnected networks. In accordance with an aspect of the inventive subject matter, each entity 271, 272, 273, 274, 275, 276, 277, and 278 may contain discrete functional program modules that might make use of an API, or other object, software, firmware, and/or hardware, to request services of one or more of the other entities 271, 272, 273, 274, 275, 276, 277, and 278.

It can also be appreciated that an object, such as 275, may be hosted on another computing device 276. Thus, although the physical environment depicted may show the connected devices as computers, such illustration is merely exemplary, and the physical environment may alternatively be depicted or described comprising various digital devices such as PDAs, televisions, MP3 players, etc., software objects such as interfaces, COM objects, and the like.

There are a variety of systems, components, and network configurations that support distributed computing environments. For example, computing systems may be connected together by wired or wireless systems, by local networks, or by widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277, and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) may communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the inventive subject matter should not be limited to any single embodiment, but rather it should be construed in breadth and scope in accordance with the appended claims.

Figure 3:
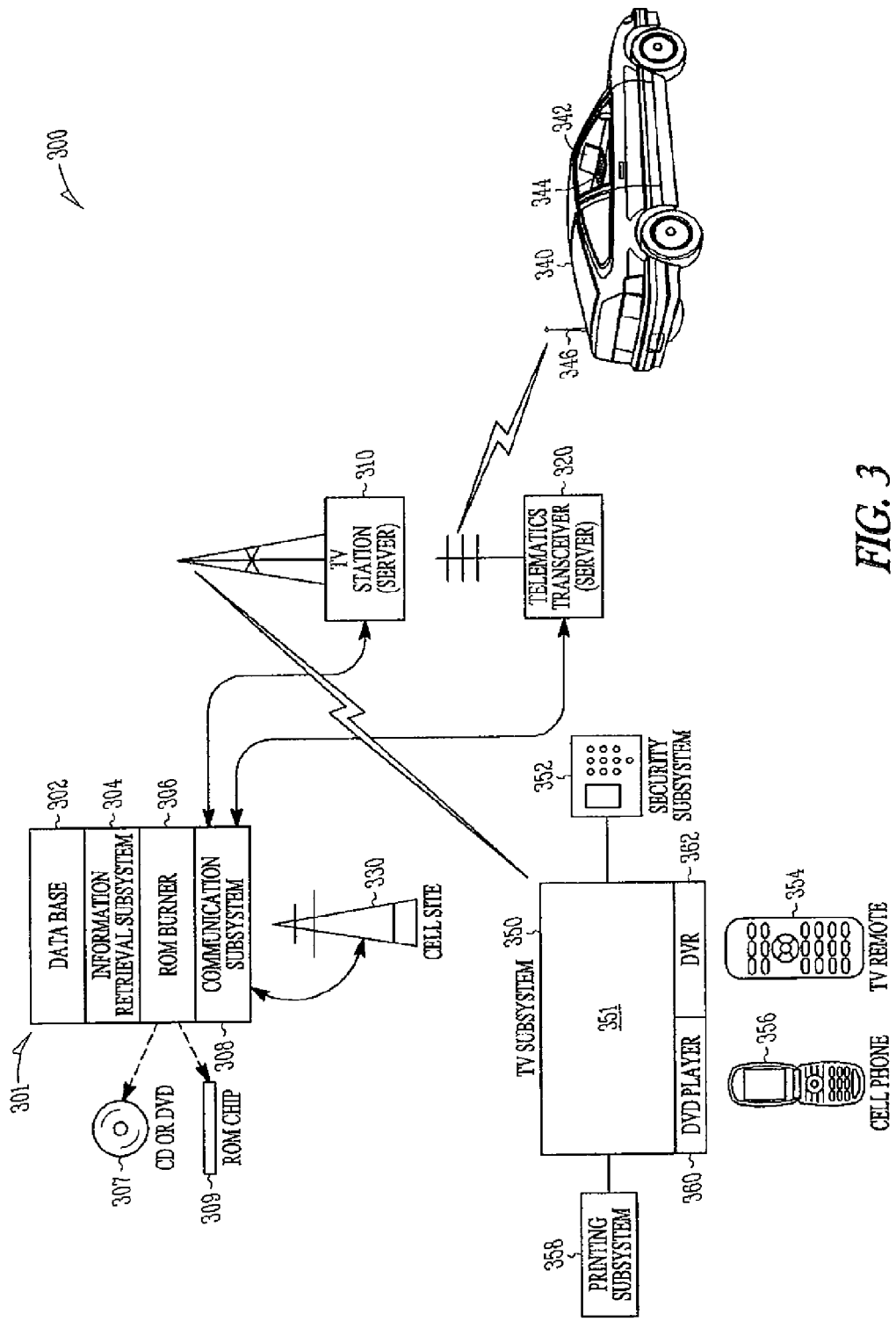
FIG. 3 is a schematic representation of information delivery systems and methods according to various embodiments.

FIG. 3 is a schematic representation of information delivery systems and methods according to various embodiments. An information delivery system, shown generally by 300, provides various ways of delivering member information quickly and efficiently. In some embodiments, the information is customized for a particular member or particular groups of members, e.g. depending upon various characteristics, known interest profiles, and/or demographics.

Information delivery channels may be optimized for members' life styles. For example, a significant portion of members may lack Internet access, computer skills, or the desire to access information through a computer. Embodiments of the inventive subject matter may include information delivery systems and methods that send information to the member's television or digital video disc (DVD) player.

As another example, a significant portion of retired people are very mobile, traveling in automobiles or mobile homes, and/or residing temporarily in hotels anywhere in the country. Thus, embodiments of the inventive subject matter may include information delivery systems and methods that provide information to the member's vehicles and to their hotel rooms.

Further, according to the inventive subject matter, specific information may be retrieved and sent to members, at their request, or to remind them of action needed on their part. For example, a member may request a monthly statement for a particular investment. As another example, a reminder or alert may be sent to a member that her mortgage payment will overdue in three days.

Many other types of information can be delivered using the systems and methods of the inventive subject matter. For example, menus of information types may be conveyed to the member from which he or she may choose delivery. The types of information are unlimited. As examples, the information could be various educational courses, information about forthcoming music events, information about good health practices and topics, a customized stock ticker, and so forth.

Sometimes, a member viewing his or her information wishes to speak with an operator immediately, perhaps to choose supplemental material, or to clarify the material, or to purchase one of several displayed products, or to accept the terms of a displayed offer or contract. Thus, embodiments are described in which a member may push a "talk to operator" button, control, or other entry element, thus setting up a two-way communication channel with an operator or advisor.

Because delivered information is often sensitive, to be seen by only the requesting or intended individual, embodiments are provided for authentication of the recipient before the information is displayed.

The recipient may desire to archive or print the delivered information, so embodiments are disclosed in which the information may be safe-stored into equipment coupled to the recipient's television, such as a recording digital video receiver or a printer.

Many other embodiments are described herein, as will be seen from the following description.

Referring now to FIG. 3, a variety of equipment is illustrated, not all of which is by any means necessary to implement various systems and methods of the inventive subject matter. The exemplary equipment will now be discussed.

An information server, shown generally by 301, may be utilized, for example, by an organization to store information in a database 302, wherein the information is of some pertinence to the organization's members. The information, as will be apparent from the discussion above, may be of any type, including financial records, medical records, travel destinations, events information, and the like.

At least one information retrieval subsystem 304 is coupled to the database 302, and, upon command to do so, it retrieves information, possibly upon request of a member, to be delivered to the member. At least one communication subsystem 308 is coupled to the information retrieval subsystem, and it receives requests for information, as well as transmits or conveys retrieved information to suitable information-disseminating apparatus, such as, but not limited to, TV station 310 (also referred to herein as a TV server) and/or telematics transceiver 320 (also referred to herein as a telematics server). Information server 301 may also include at least one read-only memory (ROM) recording subsystem 306 (also referred to herein as ROM burner) to record information onto digital recording media, such as, but not limited to, compact discs (CDs) or digital video discs (DVDs) 307, and/or ROM chips 309.

A cellular telephone site 330 may be coupled to communication subsystem 308. In addition, telephone land lines (not shown) and satellite transceivers (not shown) may also be coupled to communication subsystem 308.

Now, in viewing the equipment in the bottom half of FIG. 3, we see various examples of information-receiving and information-requesting equipment that could typically be utilized by a member. A television (TV) subsystem 350 having a TV screen 351 may comprise any type or brand of television, although digital and/or wide-screen TVs may illustrate certain types of information with higher resolution than analog TVs and are thus generally preferred for those types of documents, including documents with small font. A TV remote 354 may be used by a member for various purposes associated with the inventive subject matter, including selecting or requesting information, possibly from an on-screen menu, and possibly selecting a dedicated TV channel sponsored by the member's organization. The member may use a cell phone 356 to communicate with communication subsystem 308, for example to make a request and/or to select an object or option to be displayed or being displayed.

TV subsystem 350 may also include or be coupled to a security subsystem 352 that may be used to authenticate an intended recipient, especially with regard to sensitive or confidential information. The security subsystem 352 may operate to allow the display of information after the member enters a password or a biometric (e.g., a thumbprint or retina scan).

TV subsystem 350 may also include a DVD player 360 that may be used to display information delivered to the member via a DVD. TV subsystem 350 may also include a digital video receiver (DVR) 362 to receive information in digital format and to display it on TV screen 351. If the DVD player 360 and/or DVR 362 are of the recording type, a member may optionally use either to record information delivered by the TV subsystem 350.

TV subsystem 350 may also include a printing subsystem 358, which may optionally be used by a member to print information delivered by the TV subsystem 350.

If a member is traveling in a vehicle 340, he or she may receive information via an in-vehicle display unit 342 having a keyboard or other suitable control element 344. Information may thus be received via vehicle antenna 346 from a wireless telematics transceiver 320. If the vehicle display unit 342 supports two-way communications, it can transmit a member's request for information to telematics transceiver 320, and from there to communication subsystem 308, for retrieval by information retrieval subsystem 304 from database 302. The information may subsequently be delivered to the member via a channel using the same or possibly different communication equipment, and it may be displayed to the member on display unit 342 and possibly also be delivered in audio format, if audio capability is supported by the telematics display unit 342.

As merely one example, a member traveling in vehicle 340 may receive an alert from information server 301 that his auto insurance is about to expire. The alert may ask the member whether he wants to view the terms of any auto insurance renewal. The member could indicate "yes", using keyboard 344. The information server 301 could optionally require the member to enter authenticating information, e.g. a password or thumbprint scan, into the keyboard 344, and if the member is recognized, the information server 301 retrieves and transmits via the telematics server 320 the renewal period and renewal premium. If the member approves them, he would indicate "yes", again using keyboard 344.

Figure 4:
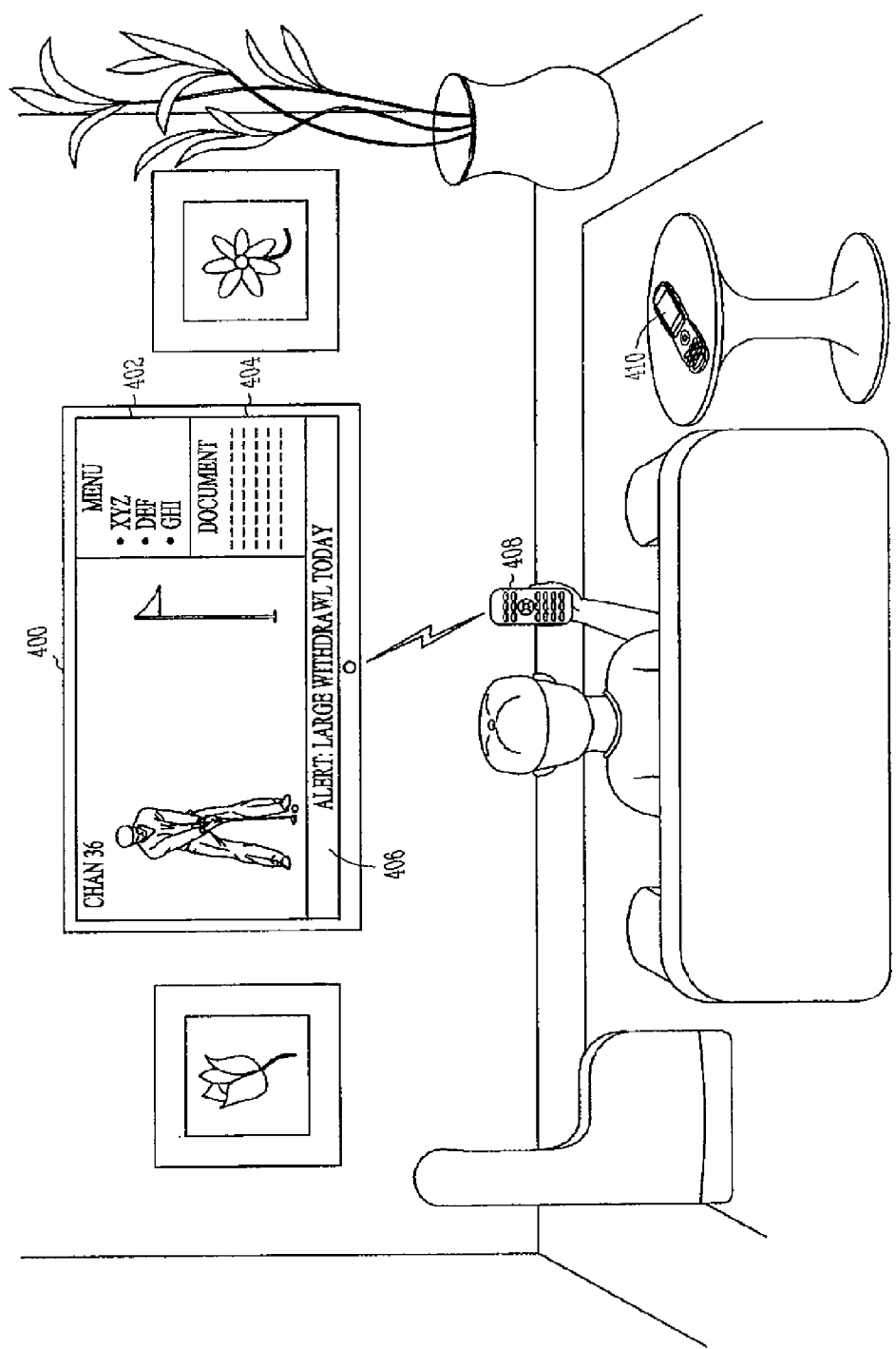
FIG. 4 is a perspective depiction of an information delivery system according to various embodiments.

FIG. 4 is a perspective depiction of an information delivery system according to various embodiments. As shown in this scenario, a member, watching his large-screen digital TV 400, may view a menu area 402 of information choices and select a choice by pushing an appropriate entry sequence on a digital remote control 408. A document may be displayed in document display area 404. In embodiments, some documents may be displayed in half-page format, i.e. first one half of a document page, followed by the other half of the page. Other documents may be displayed in any other suitable format.

An alert area 406 may display an alert or notice to the member. The menu area 402, document display area 404, and alert area 406 may be moved, as desired, to different parts of the TV screen than as shown in FIG. 4. They may also be arranged to be in areas that don't interfere with the TV program being received.

Alternatively, the member may use a telephone 410, or possibly a computer or handheld digital device (not shown), such as a personal digital appliance (PDA), to communicate a request for information from the information server 301 (FIG. 3), via the infrastructure shown in FIG. 3 and described above. Many other embodiments and alternative methods of requesting, retrieving, and displaying information on a TV may be envisioned, given the present disclosure.

Some embodiments may include a number of methods.

Figure 5A:
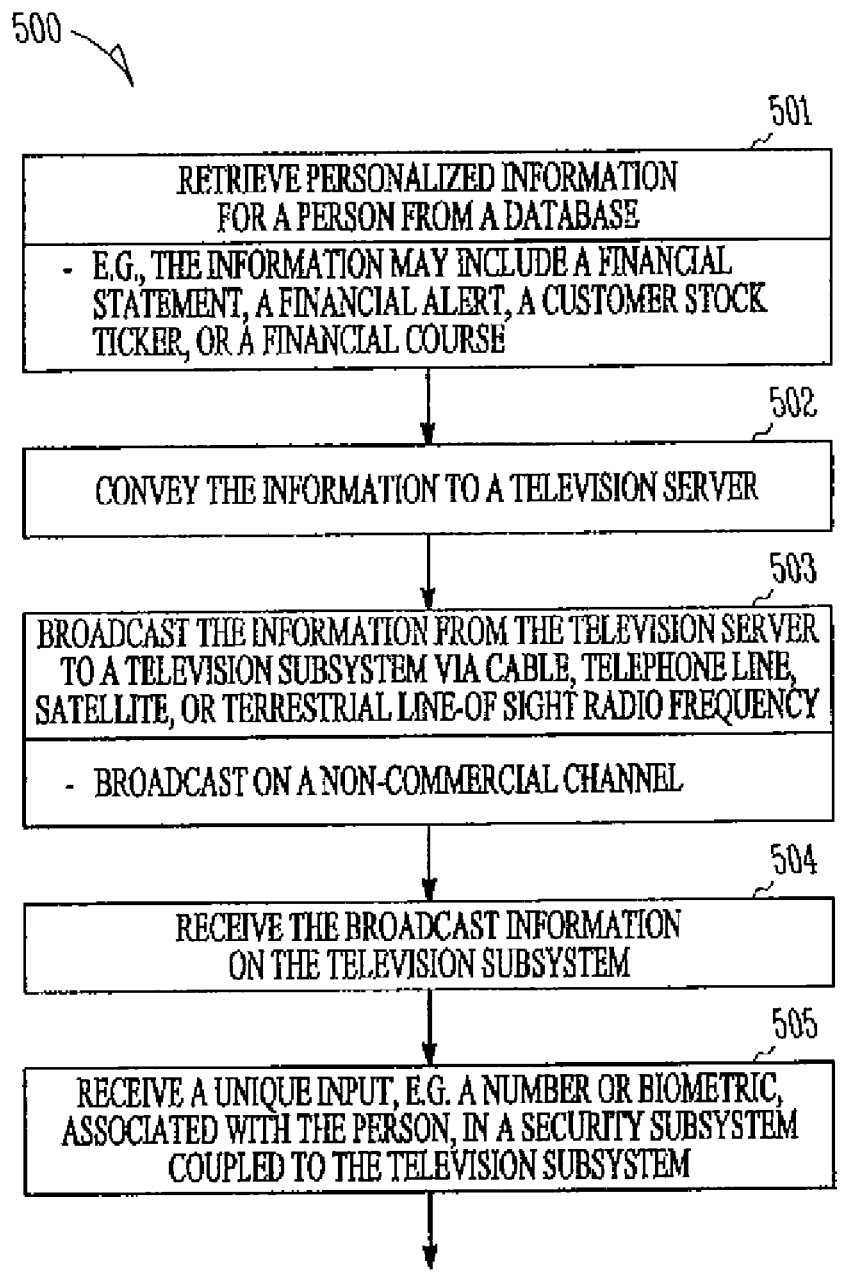
FIGS. 5A and 5B together constitute a flow diagram illustrating several methods according to various embodiments.
Figure 5B:
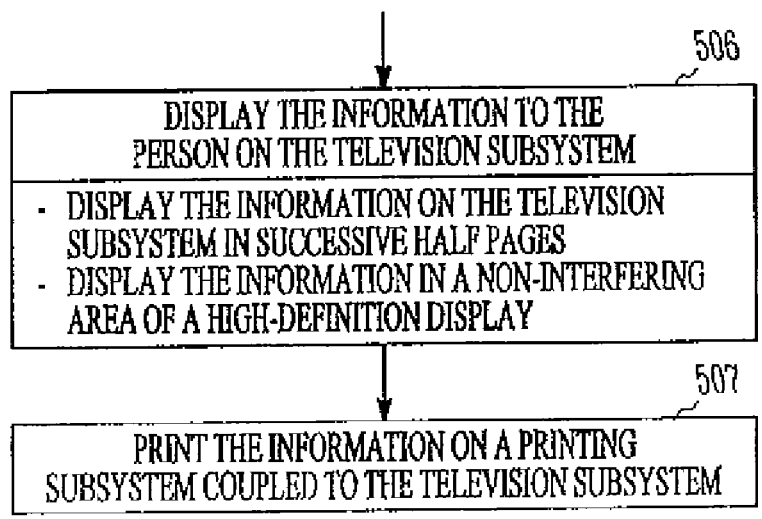
Figure 6A:
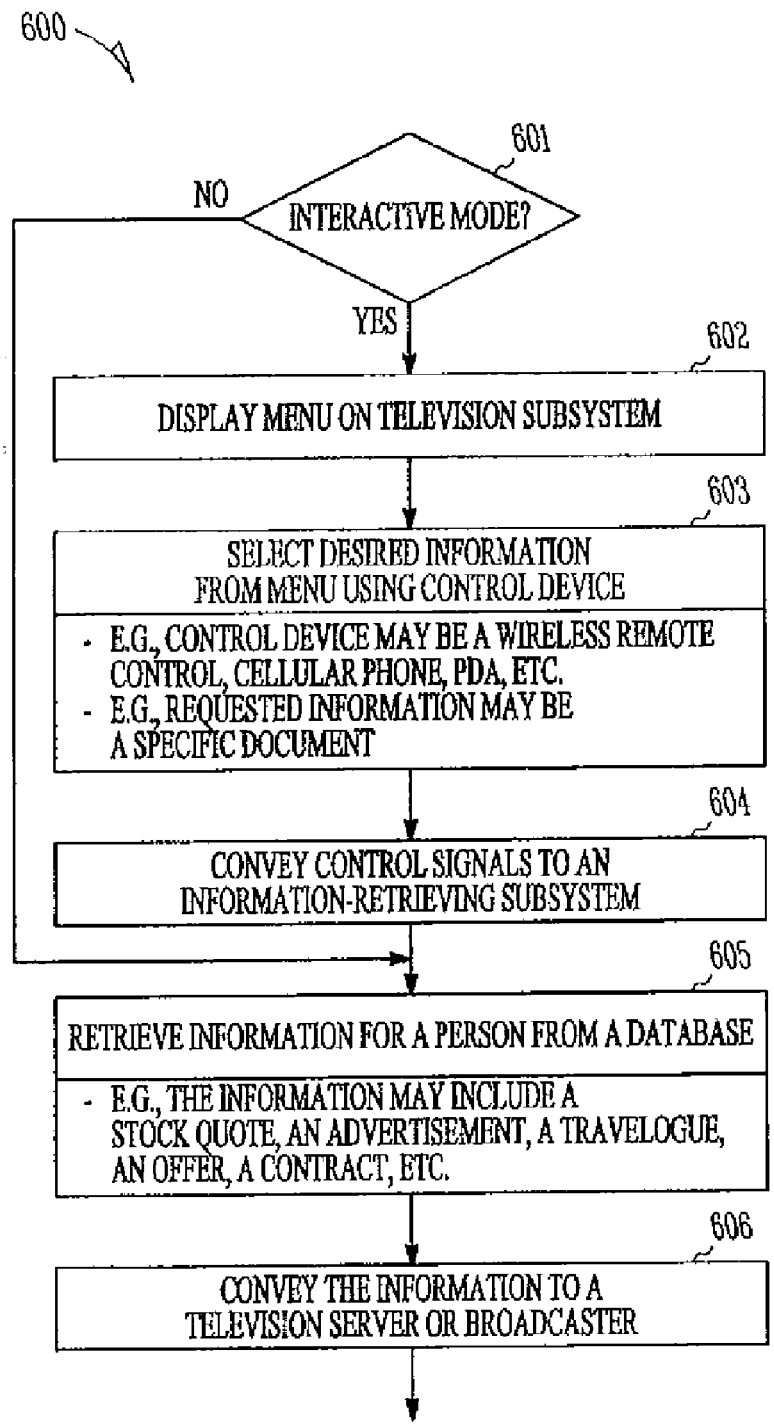
FIGS. 6A-6E together constitute a flow diagram illustrating several methods according to various embodiments.
Figure 6B:
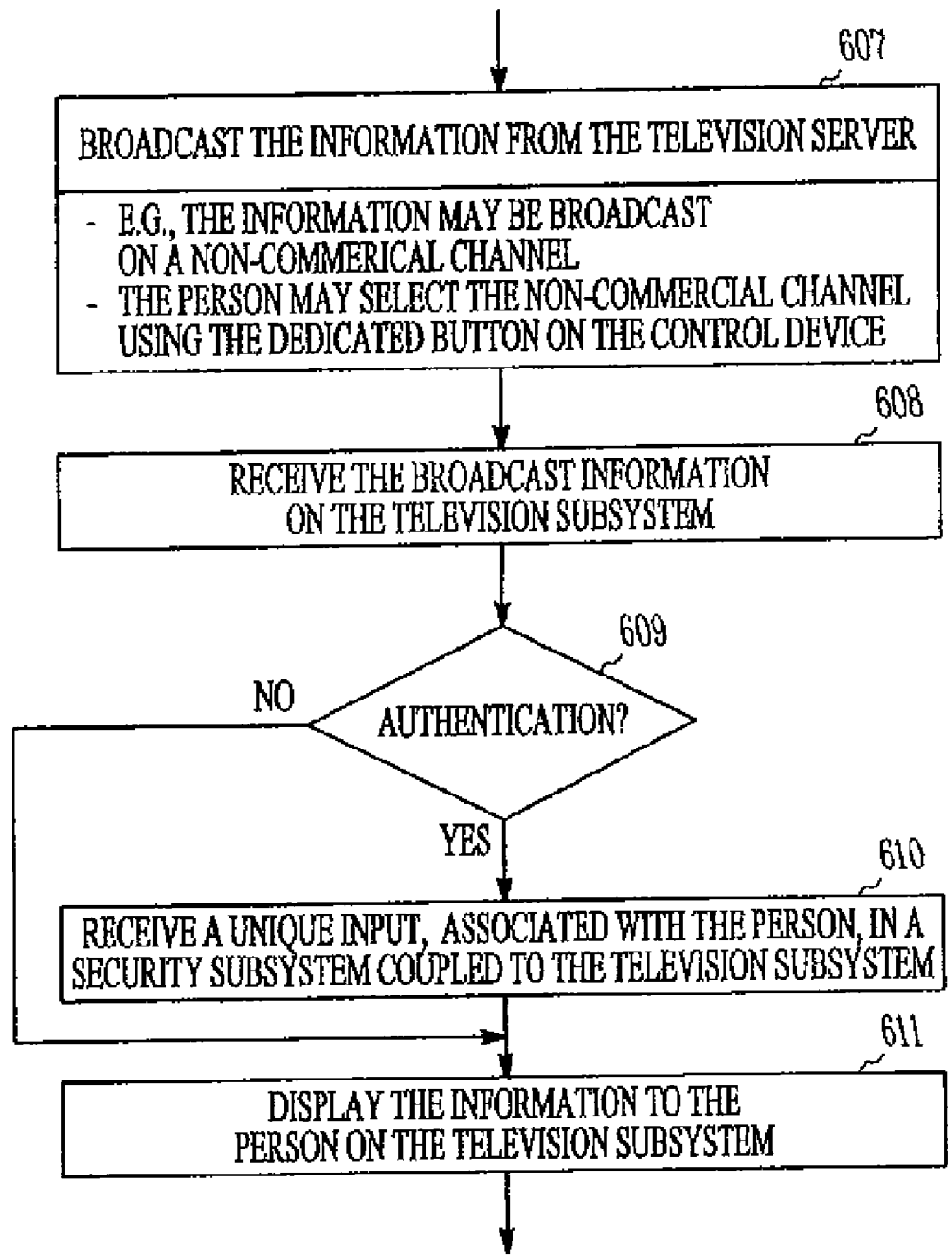
Figure 6C:
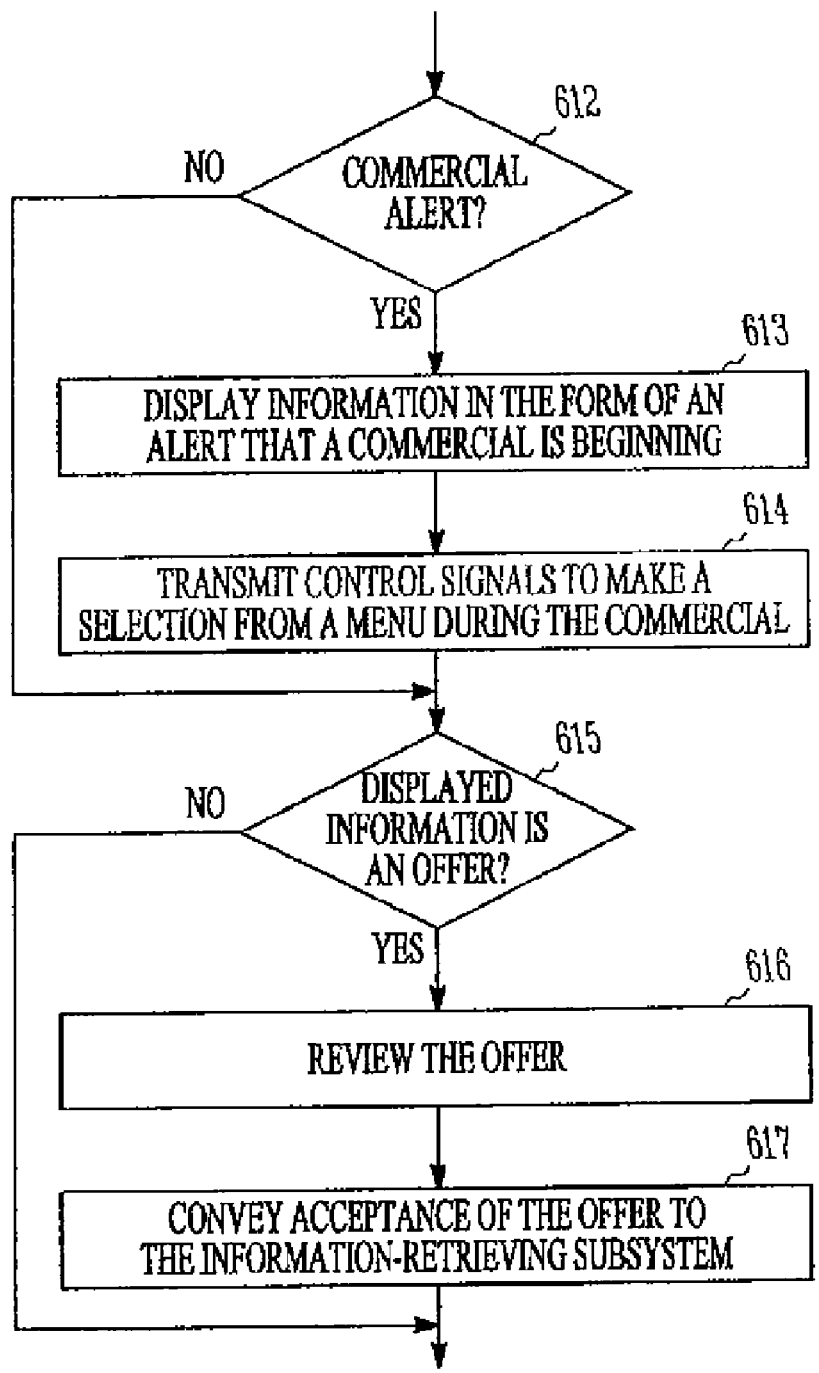
Figure 6D:
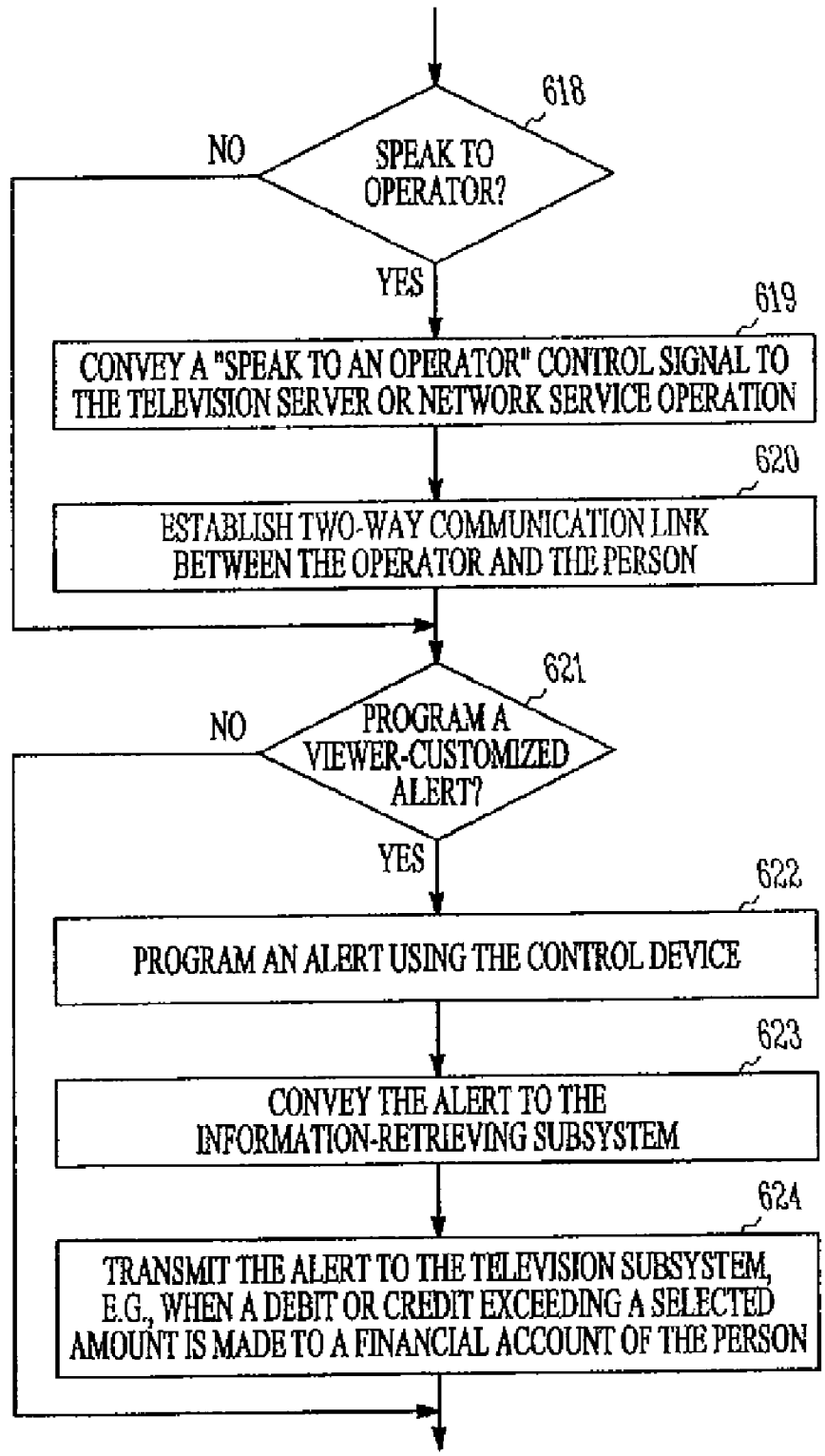
Figure 6E:
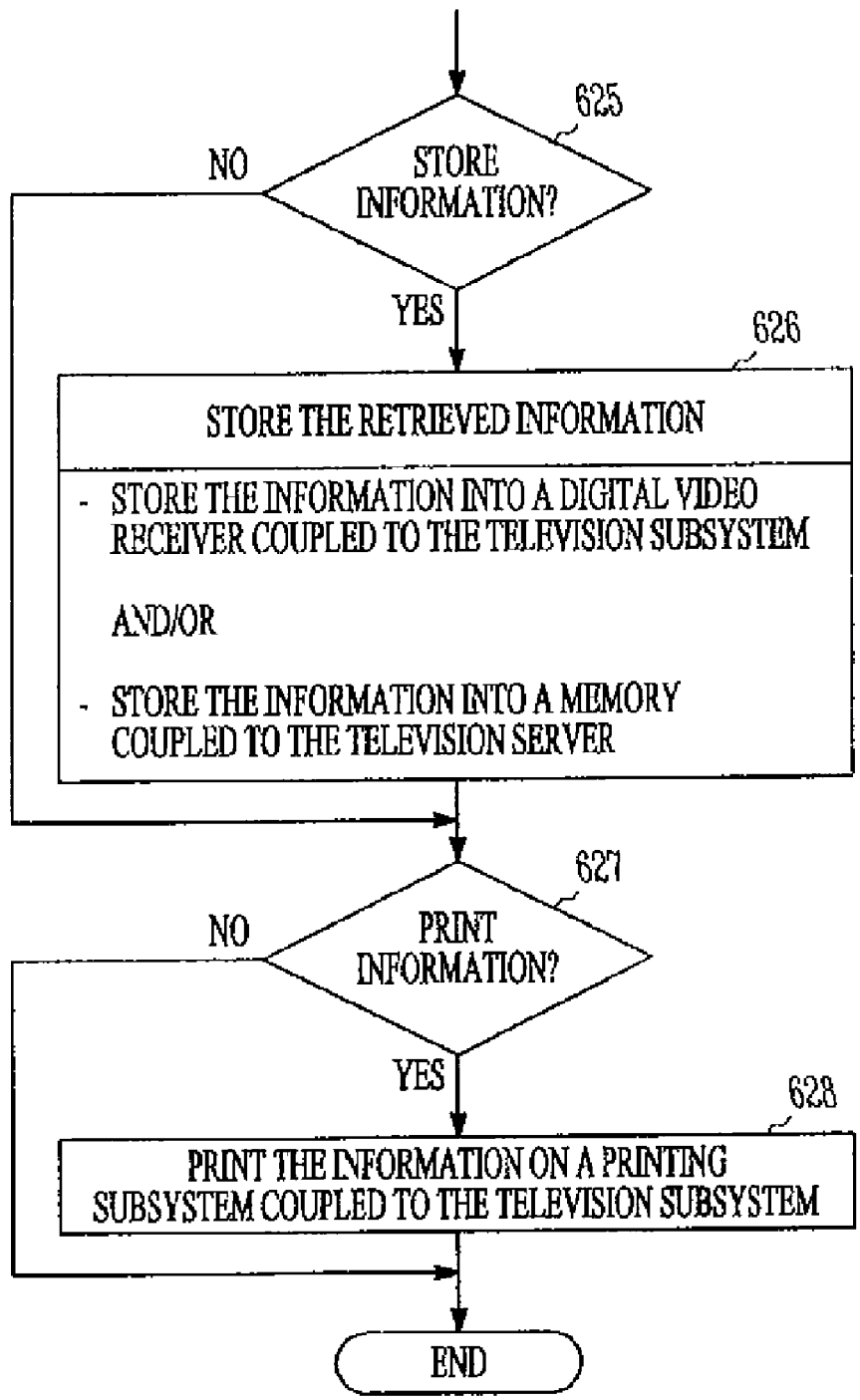

FIGS. 5A and 5B together constitute a flow diagram illustrating several methods 500 according to various embodiments. Some embodiments may retrieve information, generally customized for a particular member, from a database, and convey the information to the member. The information may have been requested by the member, or in some instances it may be an alert or other information that the member may find of interest but not have specifically requested.

In 501, information is retrieved for a person from a database. The information may be personalized to the intended recipient, but it need not necessarily be. The information may, merely by way of example, be in the form of a financial monthly statement from a financial institution, a financial alert (e.g. a predesignated stock's price has reached a predesignated value), a custom stock ticker (e.g. a continuous display of a list of predesignated stocks and their latest trading price), a financial course (e.g. a short course on home equity loans or automobile insurance), or any other information. Referring briefly to FIG. 3, in some embodiments, the information could be retrieved from database 302 by information retrieval subsystem 304.

Referring again to FIG. 5A, in 502, the information is conveyed to a TV server (e.g. TV station 310, FIG. 3, through communication subsystem 308).

In 503, the information may be broadcast from the TV server to a TV subsystem (e.g. TV subsystem 350, FIG. 3) via a cable TV network, telephone infrastructure, satellite, or terrestrial line-of-sight radio frequency infrastructure. In some embodiments, the broadcast may be on a dedicated non-commercial channel. The dedicated channel could be leased, in whole or in part, by the member's organization. In some embodiments, the member could select the dedicated channel through a dedicated "one-click" button, control, or entry element on a TV or on a TV remote control.

In 504, the broadcast information is received by the TV subsystem.

In 505, if authentication of the intended viewer is desirable or required, the member may input a unique number or biometric into a security subsystem (e.g. security subsystem 352, FIG. 3) coupled to the TV subsystem. Authentication may be optional, depending upon the nature of the information. The member may designate his or her authentication preferences by notifying the information server 301 in any suitable manner, e.g. by mail, email, telephone, 2-way interactive TV, or other way.

In 506, the information may be displayed to the person on the TV subsystem. If the information is in the form of letter-sized or legal-sized paper, it may be displayed in successive half pages. The information may be displayed in a non-interfering area of the TV screen. If the display documents have small font, it is preferred, but not essential, to display them on a TV subsystem having corresponding resolution, such as a high-definition TV.

In 507, the information may be printed on a printing subsystem communicatively coupled to the TV subsystem.

FIGS. 6A-6E together constitute a flow diagram illustrating several methods 600 according to various embodiments. Some embodiments may retrieve and convey information that has been ordered by a member in an interactive mode, for example by displaying an on-screen menu of informational choices.

In 601, if the system has interactive capability, a member may determine whether to use it or not. If not, the method proceeds to 605. If so, the method proceeds to 602, where a menu of informational choices is displayed on the member's TV subsystem.

In 603, the member may select desired information from the menu, using a suitable control device, such as a TV remote. Other devices may also be used to make a menu selection. For example, a member may make it by telephone, by text-messaging, or via a message sent by PDA or computer. The requested information may be, merely by way of example, a specific document, e.g. a medical or insurance record.

In 604, the member's request may, in some embodiments, be conveyed to an information-retrieving subsystem via control signals from the member's TV remote, cell phone, or other electronic device.

In 605, the requested information is retrieved for the person from a database. The information could comprise, merely by way of example, a stock quote, an advertisement tailored to the person (e.g. for golf clubs, if the member's advertising preferences have been previously indicated), a travelogue (again if travel preferences have been indicated), an offer (e.g. to renew the person's auto insurance), a contract (e.g. for lawn care services), and the like.

In 606, the information is conveyed to a TV server or broadcaster.

In 607, the TV server broadcasts the information. As mentioned earlier, the information may optionally be broadcast on a non-commercial channel, which optionally could be selected through a dedicated "one-click" button, control, or entry element on the TV or control device.

In 608, the broadcast information is received on a TV subsystem.

In 609, if authentication is being used, the method proceeds to 610; otherwise, it goes to 611.

In 610, a security subsystem coupled to the TV subsystem receives a unique input, associated with the intended recipient. If authentication is proven, the method proceeds to 611; otherwise, the broadcast information is not displayed.

In 611, the information is displayed to the person on the TV subsystem.

In 612, the system optionally may broadcast a special "commercial alert" to the viewer. If this option is in effect, the method proceeds to 613; otherwise, it goes to 615.

In 613, the broadcast system may display information on the screen in the form of an alert that a commercial period of one or more commercials is about to begin, and giving the viewer the option (if suitable enabling equipment is available), to request information during the commercial period.

In 614, if the viewer desires to take advantage of the commercial period to view information, he or she may request such information, e.g. by transmitting control signals to the information server to make a selection from a menu, phoning the information server, or in any other manner described herein.

In 615, if the displayed information represents an offer, the method proceeds to 616; otherwise, it goes to 618.

In 616, the viewer may review the offer.

In 617, if the viewer finds the offer acceptable, he or she may convey acceptance of the offer to the information server, e.g. by transmitting control signals to the information server, by phoning the information server, or in any other manner described herein.

In 618, if the viewer wishes to speak to an operator, counselor, advisor, teacher, speaker, broker, lawyer, entertainer, or any other person who is available to speak to members requesting additional information, the method proceeds to 619; otherwise, it goes to 621.

In 619, the viewer sends a "speak to an operator" control signal to the TV server, information server, or to a network service operation that has been established to handle operator requests.

In 620, a two-way communications link is established between the operator and the requesting member. This link could be by telephone, text-messaging, email, or via a suitably implemented interactive TV system.

In 621, if the viewer desires to program a customized alert, the method advances to 622; otherwise, it bypasses the alert-programming feature and goes to 625.

In 622, the viewer may program a desired alert using a control device. The alert may be selected, for example, from a menu that is applicable to the demographics of the viewer. For example, if the viewer has previously designated a "sports" profile, the viewer may program an alert to inform him or her of a score for a specific sports team or individual competitor. If the viewer has designated a "banking" profile, the viewer may program an alert to transmit a notice if a debit or credit exceeding a selected amount is made to the viewer's bank account.

In 623, the alert is conveyed to the information-retrieving subsystem of the information server.

In 624, the alert is transmitted to the TV subsystem. Merely as an example, the alert could be that a debit or credit exceeding a selected amount (e.g. $200) has been made to the viewer's bank account, credit card, debit card, or other financial account. The actual display of such notice may be subject to proper viewer authentication.

In 625, if the viewer desires to store the retrieved information, the method proceeds to 626; otherwise, it advances to 627.

In 626, the retrieved information may be stored into any convenient storage, either at the viewer's location or elsewhere. For example, if the viewer has a recording digital video receiver (DVR) or printer coupled to the TV subsystem, the information is stored therein. Alternatively, the information could be stored into a memory coupled to the TV station, for subsequent rebroadcast on demand.

In 627, if the member desires to print the retrieved information, the method proceeds to 628; otherwise, it ends.

In 628, the retrieved information may be printed on a printing subsystem coupled to the TV subsystem.

Figure 7A:
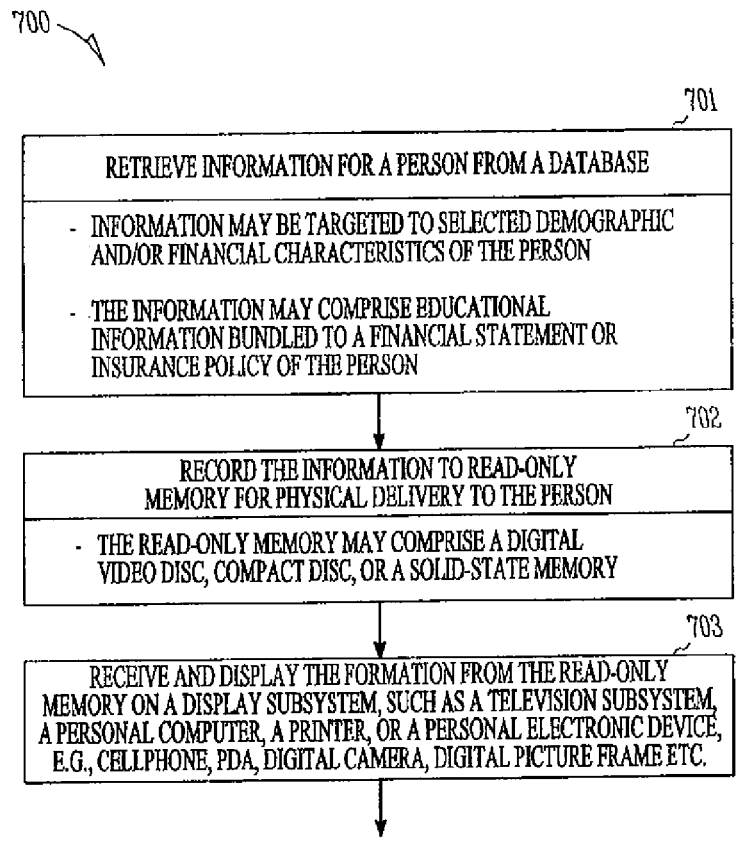
FIGS. 7A and 7B together constitute a flow diagram illustrating several methods according to various embodiments.
Figure 7B:
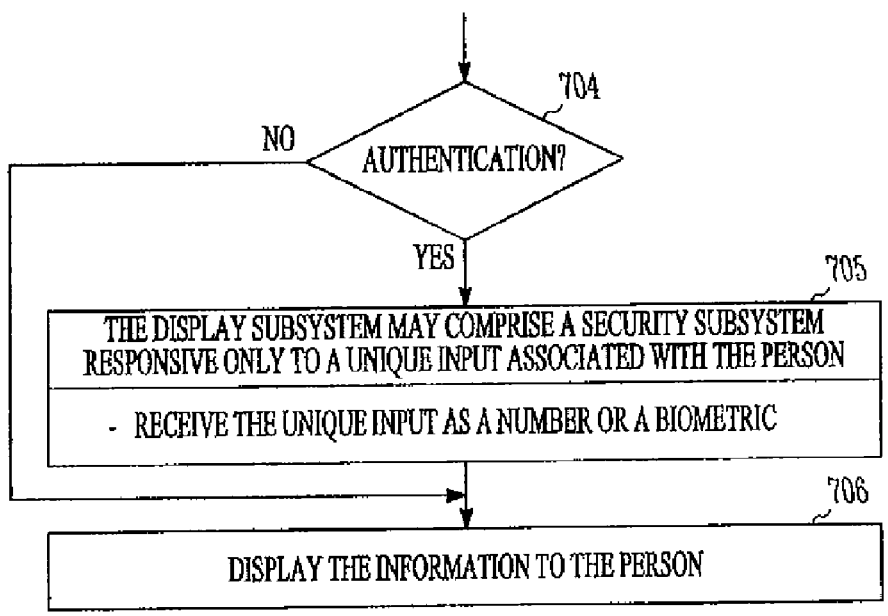

FIGS. 7A and 7B together constitute a flow diagram illustrating several methods 700 according to various embodiments. Some embodiments may retrieve and convey information that has been ordered by a member in read-only memory format for physical delivery to the member.

In 701, information is retrieved for a person or member from a database. The information may be targeted to selected demographic and/or financial characteristics of the person. Merely as an example, the information may comprise educational information bundled to a financial statement or to an insurance policy of the person. The educational information could be in the format of a webinar, for example.

In 702, the information is recorded to a read-only memory (ROM) (e.g. by ROM burner 306, FIG. 3). The ROM may comprise a digital video disc, compact disc, a portable solid-state memory, or the like. The ROM may be subsequently physically delivered to the person, e.g. via any suitable transport service, such as overnight delivery, U.S. Postal Service, courier, or the like.

In 703, the ROM-based information is received by the member and may be displayed on a display subsystem, such as a TV subsystem, a personal computer, a printer, a personal electronic device (e.g. a cell phone, PDA, digital camera, digital picture frame), or other equipment.

In 704, if authentication of the intended viewer is desirable or required, the method proceeds to 705; otherwise, it goes to 706.

In 705, the member may input a unique number or biometric into a security subsystem (e.g. security subsystem 352, FIG. 3) coupled to the TV subsystem. Authentication may optional, depending upon the nature of the information. If authentication is proven, the method proceeds to 706; otherwise, the ROM-based information is not displayed.

In 706, the ROM-based information is displayed to the person.

Figure 8A:
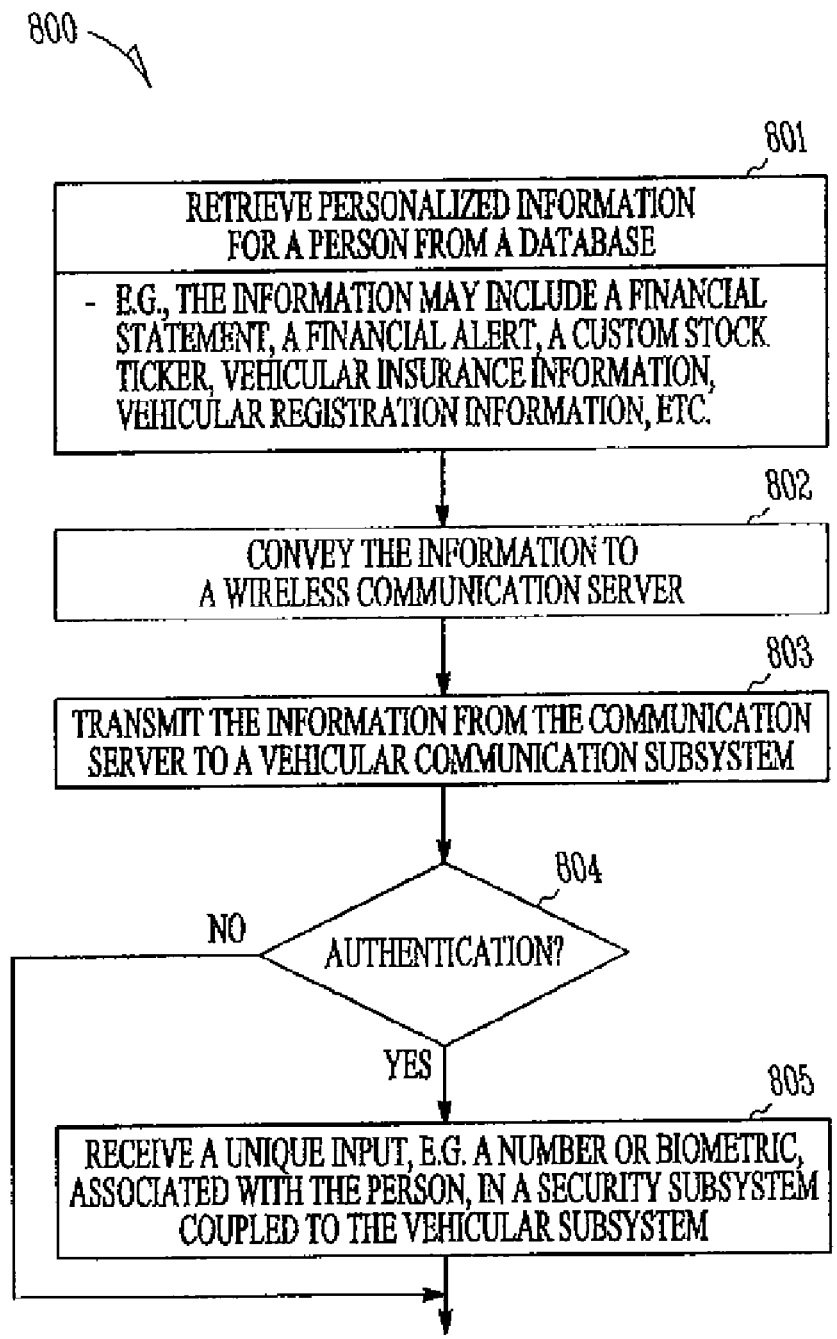
FIGS. 8A-8C together constitute a flow diagram illustrating several methods according to various embodiments.
Figure 8B:
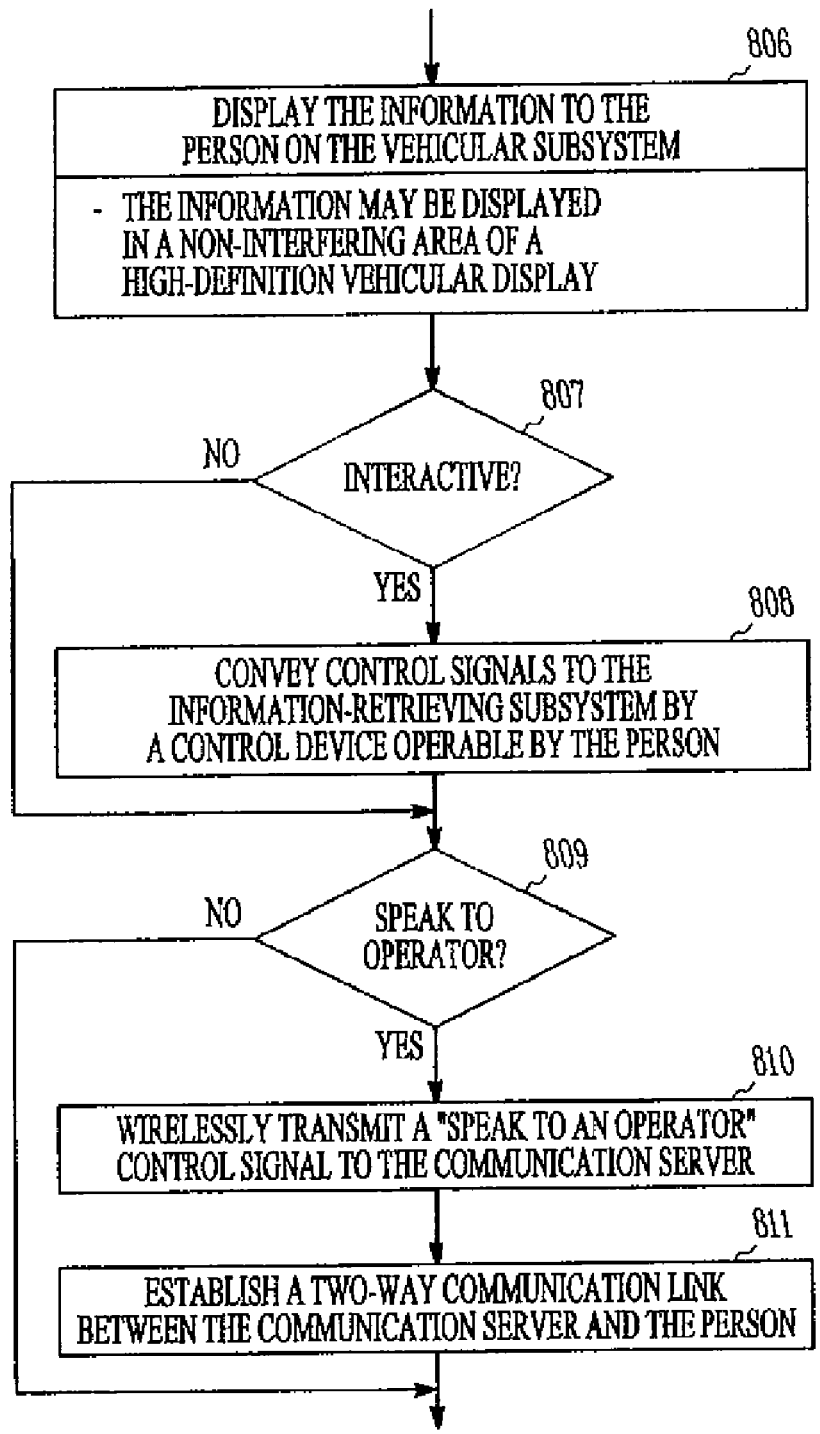
Figure 8C:
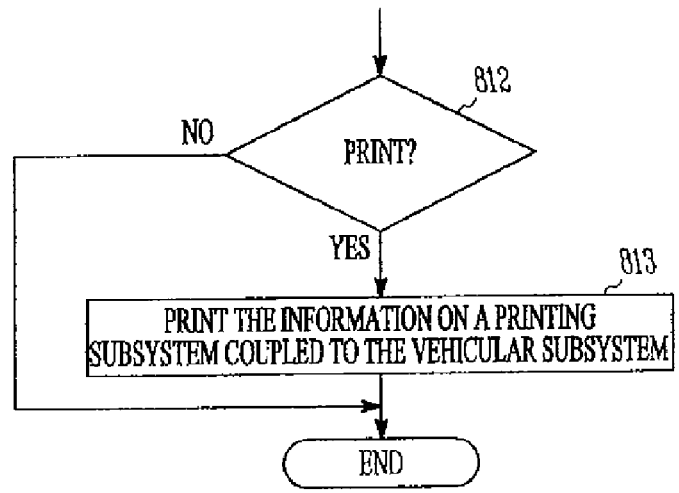

FIGS. 8A-8C together constitute a flow diagram illustrating several methods 800 according to various embodiments. Some embodiments may retrieve and convey information that has been ordered by a member for transmission to the member in a vehicle.

In 801, information is retrieved for a person or member from a database. Merely as an example, the information may comprise a financial statement, a financial alert, a custom stock ticker, vehicular insurance information, vehicular registration information, sports information for a specific team, or the like.

In 802, the information is conveyed to a wireless communications server (e.g. telematics server 320, FIG. 3).

In 803, the information is transmitted from the communications server to the member's vehicular communication subsystem (e.g. vehicle display unit 342, FIG. 3). In various embodiments, vehicular display unit 342 could either be a portable unit or a built-in unit.

In 804, if authentication of the intended viewer is desirable or required, the method proceeds to 805; otherwise, it goes to 806.

In 805, the member may input a unique number or biometric into a security subsystem (e.g. security subsystem 352, FIG. 3) coupled to the TV subsystem. Authentication may be optional, depending upon the nature of the information. If authentication is proven, the method proceeds to 806; otherwise, the transmitted information is not displayed.

In 806, the transmitted information is displayed to the person on the vehicular subsystem. If the vehicular subsystem has a high-definition display, the information may be shown in a non-interfering area that doesn't overlap a navigational display, for example.

In 807, if the system has interactive capability, a member may determine whether to use it or not. If not, the method proceeds to 809. If so, it proceeds to 808, where a menu of informational choices is displayed, for example on the member's vehicular subsystem. The member may select desired information from the menu, using a suitable control device, such as a control element that forms part of or is otherwise associated with the vehicular subsystem. Other devices may also be used to make a menu selection. For example, a member may make it by telephone, by text-messaging, or via a message sent by PDA or other computer.

In 809, if the viewer wishes to speak to an operator or advisor, the method proceeds to 810; otherwise, it goes to 812.

In 810, the viewer wirelessly sends a "speak to an operator" control signal to the communication server, information server, or to a network service operation that has been established to handle operator requests.

In 811, a two-way communications link is established between the operator and the requesting member. This link could be through the member's telematics vehicular equipment, if it supports two-way communications, or via telephone, text-messaging, or email.

In 812, if the member desires to print the retrieved information, the method proceeds to 813; otherwise, it ends.

In 813, the retrieved information may be printed on a printing subsystem coupled to the vehicular subsystem.

It should be noted that the various operations shown in the flow diagrams do not necessarily have to be performed in the order illustrated or in any particular order or with any particular equipment. A preferred order of activities and a preferred set of equipment are left to the implementer, taking into consideration the objectives, budget, and available resources of the implementing organization.

Moreover, various activities described with respect to the methods identified herein can be executed in serial or parallel fashion. Some activities may be repeated indefinitely, and others may occur only once. Various embodiments may have more or fewer activities than those illustrated. It will also be understood that although certain flow diagrams show an "End", they may be performed continuously if desired.

Any of the components previously described can be implemented in a number of ways, including embodiments in software. Thus, the information delivery system 300, information server 301, database 302, information retrieval subsystem 304, ROM burner 306, communication subsystem 308, TV server 310, telematics server 320, cell site 330, vehicle display unit 342, vehicle keyboard 344, TV subsystem 350, security subsystem 352, printing subsystem 358, DVD player 360, DVR 362, TV remote 354, cell phone 356, digital TV 400, TV remote 408, and cell phone 410 may all be characterized as "modules" herein.

The modules may include hardware circuitry, single or multi-processor circuits, memory circuits, software program modules and objects, firmware, and combinations thereof, as desired by the architect of the information retrieval and delivery system, and as appropriate for particular implementations of various embodiments.

The apparatus and systems of various embodiments can be used in applications other than requesting, retrieving, and delivering the exemplary information described herein. Thus, various embodiments are not to be so limited. The illustrations of the information delivery system 300, including the information server 301, TV subsystem 350, and vehicular display unit 342, are intended to provide a general understanding of the structure of various embodiments. They are not intended to serve as a complete description of all the elements and features of apparatus and systems that might make use of the structures described herein.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 9 further below.

The various systems, methods, and techniques described herein may be implemented with hardware or software or, where appropriate, with a combination of both. Thus, the methods and apparatus of the present inventive subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the inventive subject matter. In the case of program code execution on programmable computers, the computer will generally include a processor, a storage medium readable by the processor (including volatile and non-volatile memory and/or storage elements), at least one input device, and at least one output device. One or more programs are preferably implemented in a high-level procedural or object oriented programming language to communicate with a computer system. However, the program(s) can be implemented in assembly or machine language, if desired. In any case, the language may be a compiled or interpreted language, and combined with hardware implementations.

The methods and apparatus of the present inventive subject matter may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the inventive subject matter. When implemented on a general-purpose processor, the program code combines with the processor to provide a unique apparatus that operates to perform the functionality of the systems and methods described herein.

While the present inventive subject matter has been described in connection with the preferred embodiments of the various figures, it is to be understood that other similar embodiments may be used, or modifications and additions may be made to the described embodiment for performing the same function of the present inventive subject matter without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present inventive subject matter should not be limited to any single embodiment, but rather it should be construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present inventive subject matter should not be limited to specific embodiments described herein but instead construed most broadly.

Figure 9:
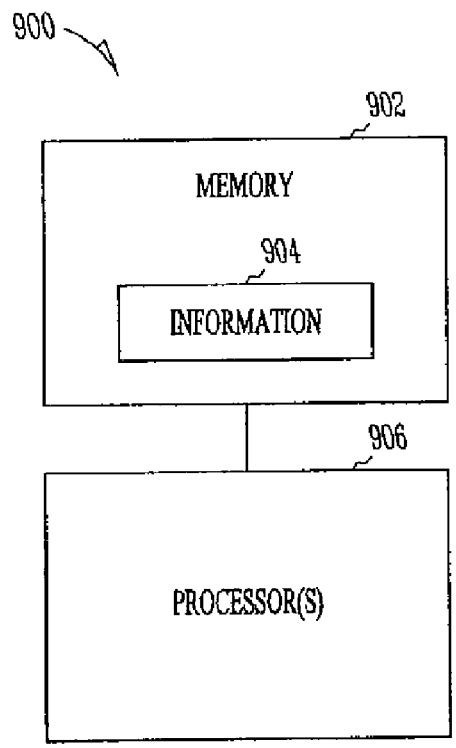
FIG. 9 is a block diagram of an article according to various embodiments.

FIG. 9 is a block diagram of an article 900 according to various embodiments. Such embodiments may comprise a computer, a memory system, a magnetic or optical disk, some other storage device, or any type of electronic device or system. The article 900 may include one or more processor(s) 906 coupled to a machine-accessible medium such as a memory 902 (e.g., a memory including electrical, optical, or electromagnetic elements). The medium may contain associated information 904 (e.g., computer program instructions, data, or both), which, when accessed, results in a machine (e.g., the processor(s) 906) performing the activities previously described herein.

Implementing the apparatus, systems, and methods, disclosed herein may enable a member of an organization to have personalized information delivered, with or without request of the member, in a cost-effective, timely manner, by employing widely available delivery channels, such as television, telemetrics, or a read-only memory. In some embodiments, the member is first authenticated to the system before the information is displayed. Improved efficiency, more relevant information, decreased delivery delays, secure display of information, and increased customer satisfaction may result.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the claims are hereby incorporated into the Detailed Description, with each claim standing on its own as a separate embodiment.

The invention claimed is:

1. An information delivery system comprising:
a vehicular subsystem that is configured to transmit and receive information;
at least one subsystem that is configured to retrieve personal information from a database upon request from a person via the vehicular subsystem;
at least one subsystem that is configured to broadcast the personal information to the vehicular subsystem;
a security subsystem coupled to the vehicular subsystem and configured to receive a unique input associated with the person and used to authenticate the person who requested the personal information;
a television subsystem that is configured to receive and display the personal information; and
a second security subsystem, coupled to the television subsystem and configured to receive a second unique input used to authenticate the person who requested the personal information.

2. The system of claim 1, further comprising a control device is configured to transmit a "speak to an operator" control signal to a communication server to establish a two-way communication link between the communication server and the vehicular subsystem.

3. The system of claim 1, wherein the vehicular subsystem comprises a high-definition display, and wherein the personal information is displayed in a non-interfering area of the display.

4. The system of claim 1, further comprising a printing subsystem coupled to the vehicular subsystem that is configured to print the personal information.

5. The system of claim 1, wherein the personal information comprises at least one of a financial statement, a financial alert, a custom stock ticker, vehicular insurance information, or vehicular registration information.

6. A method to deliver information to a person in a vehicle comprising:
providing a vehicular subsystem that is configured to transmit and receive information;
retrieving personal information from a database upon request from a person via the vehicular subsystem;
broadcasting the personal information to the vehicular subsystem;
receiving a unique input associated with the person via a security subsystem coupled to the vehicular subsystem and used to authenticate the person who requested the personal information;
receiving and displaying the personal information on a television subsystem; and
receiving a second unique input associated with the television subsystem used to authenticate the person who requested the personal information.

7. The method of claim 6, further comprising:
transmitting a "speak to an operator" control signal to a communication server; and
establishing a two-way communication link between the communication server and the vehicular subsystem.

8. The method of claim 6, wherein the vehicular subsystem comprises a high-definition display, and further comprising:
displaying the personal information in a non-interfering area of the display.

9. The method of claim 6, further comprising:
printing the personal information using a printing subsystem coupled to the vehicular subsystem.

10. The method of claim 6, wherein the personal information comprises at least one of a financial statement, a financial alert, a custom stock ticker, vehicular insurance information, or vehicular registration information.

11. A non-transitory computer-readable storage medium comprising computer-readable instructions to deliver personal information to a person in a vehicle, said computer-readable instructions comprising instructions for:
providing a vehicular subsystem that is configured to transmit and receive information;
retrieving personal information from a database upon request from a person via the vehicular subsystem;
broadcasting the personal information to be received by the vehicular subsystem;
receiving a unique input associated with the person via a security subsystem coupled to the vehicular subsystem and used to authenticate the person who requested the personal information;
receiving and displaying the personal information on a television subsystem; and
receiving a second unique input associated with the television subsystem used to authenticate the person who requested the personal information.

12. The computer-readable instructions of claim 11, further comprising instructions for:
transmitting a "speak to an operator" control signal to a communication server; and
establishing a two-way communication link between the communication server and the vehicular subsystem.

13. The computer-readable instructions of claim 11, wherein the vehicular subsystem comprises a high-definition display, and further comprising instructions for:
displaying the personal information in a non-interfering area of the display.

14. The computer-readable instructions of claim 11, further comprising instructions for:
printing the personal information using a printing subsystem coupled to the vehicular subsystem.

15. The computer-readable instructions of claim 11, wherein the personal information comprises at least one of a financial statement, a financial alert, a custom stock ticker, vehicular insurance information, or vehicular registration information.

* * * * *